(12) United States Patent
De Gaillard et al.

(10) Patent No.: US 11,396,820 B2
(45) Date of Patent: Jul. 26, 2022

(54) HYBRIDIZATION OF FIBERS OF THE FIBROUS REINFORCEMENT OF A FAN BLADE

(71) Applicant: SAFRAN AIRCRAFT ENGINES, Paris (FR)

(72) Inventors: Thomas Alain De Gaillard, Moissy-Cramayel (FR); Jérémy Guivarc'h, Moissy-Cramayel (FR); Paula Salas De Los Rios, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/290,115

(22) PCT Filed: Oct. 30, 2019

(86) PCT No.: PCT/EP2019/079747
§ 371 (c)(1),
(2) Date: Apr. 29, 2021

(87) PCT Pub. No.: WO2020/089344
PCT Pub. Date: May 7, 2020

(65) Prior Publication Data
US 2021/0396142 A1 Dec. 23, 2021

(30) Foreign Application Priority Data

Oct. 30, 2018 (FR) ...................................... 1860049

(51) Int. Cl.
*F01D 5/28* (2006.01)
*B29C 70/24* (2006.01)
(Continued)

(52) U.S. Cl.
CPC .............. *F01D 5/282* (2013.01); *B29C 70/24* (2013.01); *D03D 1/00* (2013.01); *D03D 25/005* (2013.01);
(Continued)

(58) Field of Classification Search
CPC .... F04D 29/324; F04D 29/023; F04D 29/388; F01D 5/282; F01D 5/147; F01D 5/14;
(Continued)

(56) References Cited

U.S. PATENT DOCUMENTS 4,407,885 A * 10/1983 Murphy ................ D06M 23/06
442/212
8,647,070 B2 * 2/2014 Jevons .................. F04D 29/324
416/224

(Continued)

FOREIGN PATENT DOCUMENTS

CN 102817794 B 7/2014
EP 2 253 806 A2 11/2010
(Continued)

*Primary Examiner* — Topaz L. Elliott
(74) *Attorney, Agent, or Firm* — Birch, Stewart, Kolasch & Birch, LLP

(57) ABSTRACT

The invention relates to a blade of a fan of a turbomachine, comprising a structure made from composite material, including a fibrous reinforcement Obtained by means of the three-dimensional weaving of strands and a matrix in which the fibrous reinforcement is embedded. According to the invention, the fibrous reinforcement comprises a first portion forming the leading edge and a second portion forming all or part of the trailing edge, and the strands of the fibrous reinforcement comprise first strands having a predetermined elongation at break and second strands having an elongation at break higher than that of the first strands, the first portion comprising all or some of the first strands while the second portion comprises all or some of the second strands.

20 Claims, 3 Drawing Sheets

(51) Int. Cl.
*B29L 31/08* (2006.01)
*D03D 1/00* (2006.01)
*D03D 25/00* (2006.01)
*F01D 5/30* (2006.01)

(52) U.S. Cl.
CPC .......... *F01D 5/30* (2013.01); *B29L 2031/082* (2013.01); *F05D 2220/32* (2013.01); *F05D 2220/36* (2013.01); *F05D 2230/20* (2013.01); *F05D 2240/24* (2013.01)

(58) Field of Classification Search
CPC ........ B29C 70/24; D03D 1/00; D03D 25/005; B29L 2031/082; F05D 2300/6012
See application file for complete search history.

(56) References Cited

U.S. PATENT DOCUMENTS

| | | | | |
|---|---|---|---|---|
| 9,670,788 | B2* | 6/2017 | Hoyland | F04D 29/023 |
| 10,180,069 | B2 | 1/2019 | Coupe et al. | |
| 10,590,945 | B2* | 3/2020 | Paquin | B32B 27/08 |
| 11,168,567 | B2* | 11/2021 | Gondre | F04D 29/324 |
| 2007/0189902 | A1* | 8/2007 | Mohamed | D03D 25/005 |
| | | | | 416/226 |
| 2010/0296942 | A1* | 11/2010 | Jevons | F01D 5/282 |
| | | | | 416/229 R |
| 2013/0017094 | A1* | 1/2013 | Coupe | D03D 25/005 |
| | | | | 29/889.71 |
| 2014/0286765 | A1* | 9/2014 | Hoyland | F01D 9/041 |
| | | | | 415/200 |
| 2016/0115820 | A1* | 4/2016 | Prentice | B22C 9/108 |
| | | | | 415/200 |
| 2018/0045207 | A1* | 2/2018 | Paquin | B29C 70/08 |
| 2019/0234420 | A1* | 8/2019 | Bryant, Jr. | B32B 3/14 |
| 2020/0109634 | A1* | 4/2020 | Gondre | F04D 29/023 |
| 2020/0141268 | A1* | 5/2020 | Kray | F01D 5/282 |
| 2021/0372428 | A1* | 12/2021 | De Gaillard | D03D 15/283 |
| 2021/0381396 | A1* | 12/2021 | Kappes | F01D 21/045 |

FOREIGN PATENT DOCUMENTS

| | | | |
|---|---|---|---|
| FR | 2 955 609 A1 | 7/2011 | |
| FR | 3 040 909 A1 | 3/2017 | |
| FR | 3 049 002 A1 | 9/2017 | |
| GB | 2 091 633 A | 8/1982 | |
| WO | WO-2022053753 A1 * | 3/2022 | ............ B29B 11/16 |

* cited by examiner

HYBRIDIZATION OF FIBERS OF THE FIBROUS REINFORCEMENT OF A FAN BLADE

FIELD OF THE INVENTION

The invention relates generally to the field of gas turbine engines, and more particularly that of the fan blades of these gas turbine engines and their manufacturing process.

The invention is particularly applicable to fan blades made of composite material and their interaction with the inlet of the primary duct.

TECHNOLOGICAL BACKGROUND

Gas turbine engine blades, and in particular fan blades, are subject to significant mechanical and thermal stresses and must meet strict weight and space requirements. It has therefore been proposed to use blades made of a composite material comprising a fibrous reinforcement densified with a polymer matrix, which are lighter than metal blades with equivalent propulsive characteristics and which have a satisfactory heat resistance.

During the certification and life of an engine, fan blades are subject to bird and hail ingestions. However, depending on the type of object impacting the blade (and in particular its size, its mass) and on the type of fan (rotation speed and number of blades), the preferred areas for damage initiation and propagation are different. The mechanical behavior of fan blades is therefore optimized during the design phase of the blades to comply with certification rules.

Furthermore, current designs tend to reduce the thickness of the composite material structure of blades in areas of the leading edge, the trailing edge, or indeed the entire structure to improve aerodynamic performance. At iso-material and iso-stacking law, the capacity of the blade to resist an impact is consequently reduced.

SUMMARY OF THE INVENTION

An objective of the invention is therefore to remedy the above-mentioned drawbacks, by proposing a fan blade for a gas turbine engine with improved ingestion behavior.

To that end, the invention proposes a fan blade for a gas turbine engine comprising a composite material structure comprising a fibrous reinforcement obtained by three-dimensional weaving of strands and a matrix in which the fibrous reinforcement is embedded, the composite material structure comprising a leading edge and a trailing edge,
the fibrous reinforcement comprising a first portion forming the leading edge and a second portion forming all or part of the trailing edge,
the strands of the fibrous reinforcement comprising first strands having a predefined elongation at break.

Moreover, the strands of the fibrous reinforcement further comprise second strands having a higher elongation at break than that of the first strands, the first portion comprising all or part of the first strands while the second portion comprises all or part of the second strands.

Some preferred but non-limiting features of the above-described blade are the following, taken individually or in combination:

the first portion is devoid of second strands and the second portion comprises warp strands and weft strands, the warp strands of said second portion being devoid of first strands.

the second portion extends from a tip of the blade.
the blade further comprises an airfoil having an aerodynamic profile suitable for extending into an air stream, a root configured to be attached to a disk of the fan and a shank extending between the root and the airfoil, and wherein the second portion forms the trailing edge over all or part of a height of the airfoil.
the second portion extends over at least 35% of a height of the airfoil, for example between 35% and 100% of the airfoil height.
the second portion does not comprise the root.
the second portion extends over a portion of chord length comprised between one centimeter and fifteen centimeters.
the fibrous reinforcement further comprises a third portion extending between the first portion and the second portion, a density of the second strands progressively increasing in the third portion from the first portion toward the second portion.
the third portion extends over a distance comprised between 1 cm and 10 cm.
the first and second strands comprise warp strands distributed so as to form warp columns, wherein a percentage, based on the total number of warp strands in a warp column of the third portion, of second strands inserted between two immediately adjacent columns of warp strands is at most equal to 30%, and preferably comprised between 5% and 15%.
the blade further has a plurality of warp planes intersecting the warp columns, each warp plane being separated from an immediately adjacent warp plane by a line of weft strands, with no more than 30% of the warp strands being modified between two immediately adjacent warp planes in the third portion that is intermediate, and preferably comprised between 5% and 15% of the warp strands.
the first strands have a higher Young modulus than the Young modulus of the second strands.
the elongation at break of the second strands is comprised between 1.5 and 3 times the elongation at break of the first strands.
the first strands comprise carbon or aramid fibers whose Young modulus is greater than 250 GPa and whose elongation at break is comprised between 1.5% and 2.5%.
the elongation at break of the second strands is comprised between 3% and 6%, preferably between 4% and 5%.
the second strands comprise glass or basalt fibers.
the second strands comprise warp strands.

According to a second aspect, the invention also proposes a fan for a gas turbine engine comprising a plurality of blades as described above.

BRIEF DESCRIPTION OF THE DRAWINGS

Other features, purposes and advantages of the present invention will become clearer upon reading the following detailed description, and from the appended drawings given by way of non-limiting examples and in which.

DETAILED DESCRIPTION OF AN EMBODIMENT

Figure 1:
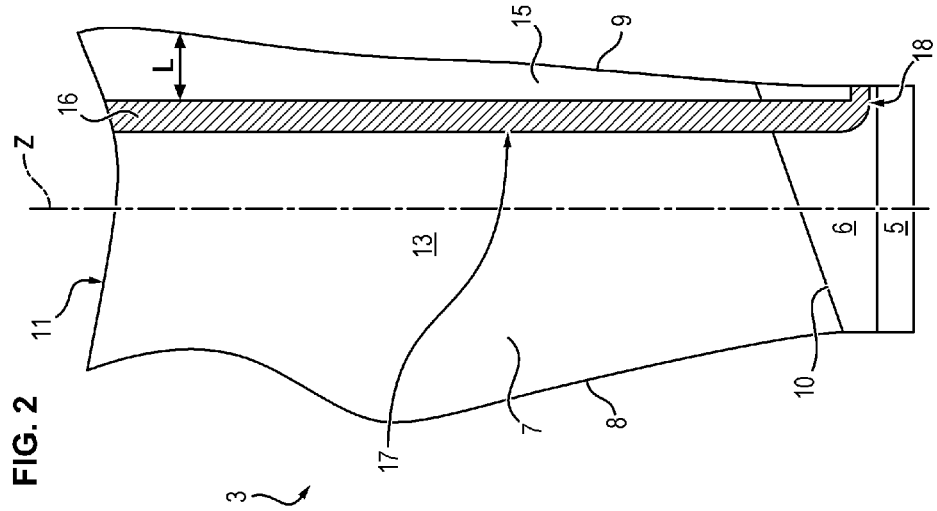
FIG. 1 is a schematic view representing a first example of a fibrous reinforcement for a fan blade in accordance with an embodiment, in which the introduction of second strands and the exit of first strands in the intermediate portion have been schematized as well as three warp planes.

In the present application, upstream and downstream are defined with respect to the normal flow direction of the gas in the fan 1 through the gas turbine engine. Furthermore, the axis of revolution of the gas turbine engine fan 1 is referred to as the axis X of radial symmetry of the fan 1. The axial direction corresponds to the direction of the axis X of the fan 1, and a radial direction is a direction perpendicular to this axis and passing through it. Finally, internal and external will be used, respectively, in reference to a radial direction so that the internal part or face of an element is closer to the axis X than the external part or face of the same element.

A fan 1 of a gas turbine engine comprises a fan 1 disk 2 carrying a plurality of fan 1 blades 3, associated with inter-blade platforms.

Each blade 3 comprises a composite material structure including a fibrous reinforcement 4 obtained by three-dimensional weaving and a matrix in which the fibrous reinforcement 4 is embedded.

This composite material structure comprises a root 5, a shank 6 and an airfoil 7 having an aerodynamic profile. The root 5 is intended to allow the attachment of the blade to the fan disk 2 and extends for this purpose between a bottom of a cavity formed in the disk 2 and the outlet of the cavity's bearing surfaces. As for the airfoil 7 having an aerodynamic profile, it is suitable for extending into an air stream, when the gas turbine engine is in operation, in order to generate lift. Finally, the shank 6 corresponds to the area of the airfoil 7 which extends between the root 5 and the airfoil 7, i.e., between the outlet of the bearing surfaces and the inter-blade platforms.

The blade 3 also comprises, in a manner known per se, a leading edge 8, a trailing edge 9, a pressure side wall and a suction side wall. The leading edge 8 is configured to extend opposite the flow of gases entering the gas turbine engine. It corresponds to the front part of an airfoil which faces the air flow and which divides the air flow into a pressure flow and a suction flow. The trailing edge 9, in turn, corresponds to the rear part of the airfoil, where the pressure and suction flows meet.

Finally, the structure is formed by a plurality of blade 3 sections stacked from the root 5 along a stacking axis Z extending radially with respect to the axis of revolution X of the fan 1.

In the following, "height" will be used to refer to a distance along the stacking axis Z.

Thus, the airfoil 7 has a height h corresponding to the distance along the stacking axis Z between its lower boundary 10, at the intersection with the shank 6, and its tip 11. The height h of the airfoil 7 can for example be measured at the intersection between the trailing edge 9 and the lower boundary 10 of the airfoil 7. The height H of the blade 3, in turn, corresponds to the distance along this axis Z between a lower face of the root 5 (configured to face the bottom of the fan disk cavity 2) and the tip 11, measured at the intersection between the trailing edge 9 and the lower boundary 10 of the airfoil 7.

The fibrous reinforcement 4 can be formed from a single-piece fibrous preform obtained by three-dimensional or multilayer weaving with evolving thickness. It comprises warp and weft strands which may in particular include carbon, glass, basalt and/or aramid fibers. The matrix, in turn, is typically a polymer matrix, for example epoxy, bismaleimide or polyimide. The blade 3 is then formed by molding using a vacuum resin injection process of the resin transfer molding (RTM) or vacuum-assisted resin transfer molding (VARTM) type.

The strands forming the fibrous reinforcement 4 comprise first strands 12 having a predefined elongation at break and second strands 14 having a higher elongation at break than that of the first strands 12. The fibrous reinforcement 4 is thus obtained by hybridization of the strands constituting it in order to make the best use of the mechanical properties of each strand according to the areas of the blade 3 and the type of stress.

The first strands 12 preferably have a high Young modulus, for example greater than 250 GPa, and have the function of enabling the design criteria of the blade 3 to be met, and in particular the frequency status of the blade 3. These first strands 12 are therefore used in the weaving of the fibrous reinforcement 4 to form the portion of the reinforcement 4 (or first portion 13) which globally comprises the lower and thicker parts of the blade 3, so that the natural frequencies of the blade 3 are high. This makes it possible to limit or at least move away the frequency crossings between the first energetic normal modes of the blade 3 and the motor harmonics. The lower and thicker parts here include the root 5 of the blade 3, the shank 6, a lower part of the airfoil 7 and the leading edge 8. In an embodiment, only the first strands 12 are used as warp and weft strands in weaving the first portion 13.

The second strands 14, whose breaking strength is greater than that of the first strands 12, their function is to limit the initiation and propagation of damage to the blade 3 when objects, and in particular birds, are ingested. These second strands 14 are therefore used in the weaving of the fibrous reinforcement 4 to form the portion of the reinforcement 4 (or second portion 15) which comprises all or part of the trailing edge 9, insofar as this area is highly stressed in the event an object is ingested. Preferably, the elongation at break of the second strands 14 is comprised between 1.5 and 3 times the elongation at break of the first strands 12. In an embodiment, only the second strands 14 are used as warp and/or weft strands in weaving the second portion 15.

In order to optimize the resistance of the blade 3 to object impacts, the second strands 14 are warp strands of the reinforcement 4 (i.e., strands extending along the stacking axis Z of the blade 3 sections). Furthermore, the second portion 15 preferably extends from a lower region of the blade 3 (which will be detailed below in the description) to the tip 11 of the blade 3.

The reinforcement 4 further comprises an intermediate portion 16 extending between the first portion 13 and the second portion 15 that is formed by both the first strands 12 and the second strands 14. In an embodiment, only the first and second strands 14 are used as warp and weft strands in weaving the intermediate portion 16.

This intermediate portion 16 is configured to serve as an interface between the first portion 13 and the second portion 15 to limit brittleness due to material discontinuities. When the fibrous reinforcement 4 comprises only first strands 12 in the first portion 13 of the blade 3 and only second strands 14 in the second portion 15 of the blade 3, and the first portion 13 and the second portion 15 are end-to-end in the reinforcement 4, the resulting blade 3 effectively prevents damage to the blade 3 in the areas comprising the second strands 14. However, the Applicant realized that in the absence of an intermediate portion 16, i.e., by abruptly introducing second strands 14 and simultaneously removing the first strands 12 at the interface between the first portion 13 and the second portion 15 of the fibrous reinforcement 4, the blade 3 obtained risked being heavily damaged at this interface in the event of an impact, because the interface between the two portions 11, 12 of the reinforcement 4 is weakened by the strong discontinuity of the material properties.

The intermediate portion 16 thus provides a transition between the material properties of the first portion 13 and the material properties of the second portion 15. To this end, the density of the second strands 14 is progressively increased within the intermediate portion 16 from the first portion 13 to the second portion 15. More precisely, at the interface 14 between the first portion 13 and the intermediate portion 16, the density of the second strands 14 is very low while the density of the first strands 12 is very high. In contrast, at the interface 15 between the intermediate portion 16 and the second portion 15, the density of the second strands 14 is very high while the density of the first strands 12 is very low.

The second portion 15 extends over a portion of chord length L comprised between one centimeter and fifteen centimeters at any point on the stacking axis Z of the blade 3. As used herein, chord is defined, for a given section of the blade 3 (and therefore for a given point of the stacking axis Z), as the straight line segment connecting the leading edge 8 to the trailing edge 9 of the blade 3.

The height h' of the intermediate portion 16 is determined as a function of the size of the blade 3, and therefore of the type of fan 1 and more generally of the gas turbine engine into which it is intended to be integrated.

As previously mentioned, the second portion 15 extends to the tip 11 of the blade 3. Ideally, in order to optimize the resistance of the blade 3 to bird strikes, the second portion 15 extends substantially the entire height H of the blade 3, i.e., from the root 5 of the blade 3 or from the shank 6 (see FIG. 2) to the tip 11, along the trailing edge 9.

In an alternative embodiment, in order to simplify the certification of the root 5/shank 6 area of the blade 3 and for manufacturing constraints, the second portion 15 extends only over a part of the airfoil 7 (see FIGS. 1 and 2), in particular from a tip 11 of the blade.

In particular, in a first embodiment (see FIG. 1), the interface between the second portion 15 and the intermediate portion 16 may be located at a distance (along the stacking axis Z of the blade 3) from the lower boundary 10 of the airfoil 7 comprised between 0% (case where the second portion 15 extends over the entire airfoil 7) and 65% of the height h of the airfoil 7. The height h of the second portion 15 is thus comprised between 35% and 100% of the height h of the airfoil 7.

This first embodiment indeed allows the behavior of the trailing edge 9 to be improved with respect to the ingestion of all types of objects (heavy birds, medium birds and light birds).

In a second embodiment, the distance between the lower boundary 10 of the blade 3 and the interface (along the stacking axis Z of the blade 3) is greater than 65% of the height h of the airfoil 7. The height h of the second portion 15 is therefore less than 35% of the height h of the airfoil 7.

This second embodiment facilitates manufacturing and limits the additional unraveling induced by the fact that the second strands 14 have a lower Young modulus than the first strands 12. However, the improvement in the behavior of the trailing edge 9 with respect to the ingestion of objects of the medium birds and light birds type is less in comparison with the first embodiment.

It follows that the dimensioning of the blade 3 makes it possible to determine the distance from which to introduce second strands 14 into the fibrous reinforcement 4, in order to combine the stiffness necessary for the frequency status (first strands 12) and elongation at break (second strands 14) for the ingestion resistance.

The height h' (dimension along the stacking axis Z) of the intermediate portion 16 is comprised between 5% and 30% of the height h of the blade 3. Thus, the height h' of the intermediate portion 16 may be between one centimeter and ten centimeters.

Figure 2:
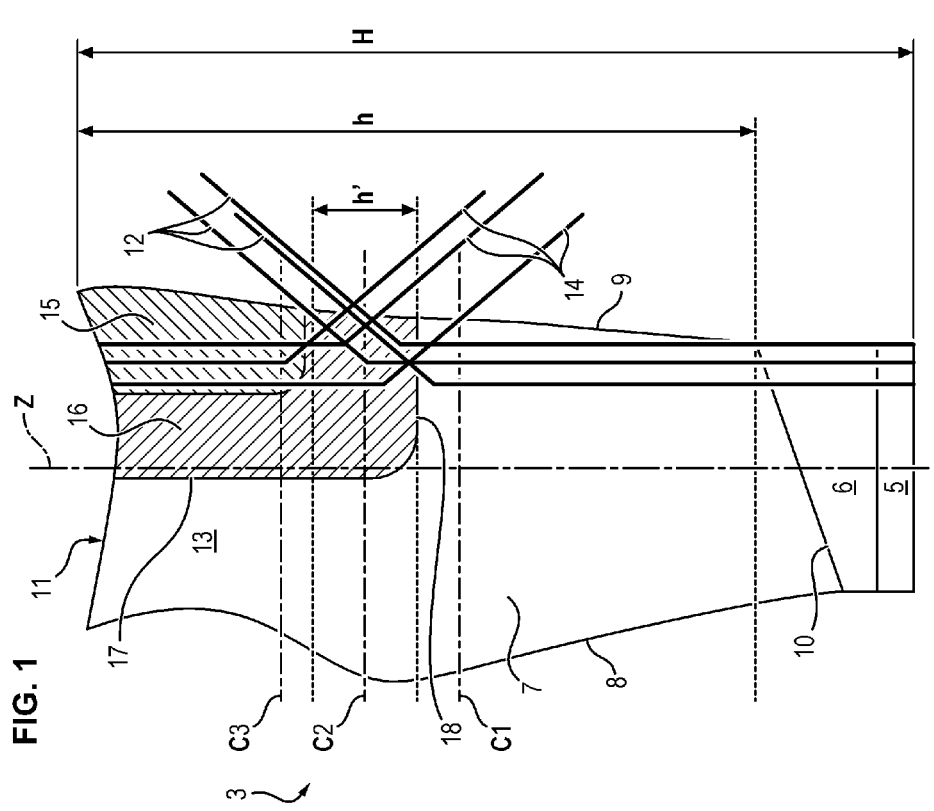
FIG. 2 is a schematic view representing a second example of a fibrous reinforcement for a fan blade.

FIGS. 1 and 2 schematically represent a blade 3 whose fibrous reinforcement 4 has been shaped from a three-dimensionally woven fibrous preform, before resin injection or densification by a matrix and possible machining, in order to obtain a fan 1 blade 3 made of composite material in accordance with the invention. Three-dimensional weaving means that the warp strands follow sinuous paths in order to interlink weft strands belonging to different layers of weft strands, with the exception of unbindings, it being noted that a three-dimensional weaving, in particular an interlock weave, may include 2D surface weaves. Different three-dimensional weaves can be used, such as interlock, multi-satin or multi-sheet weaves, for example, as described in particular in the document WO 2006/136755.

Three warp planes C1, C2, C3 have been represented in FIG. 1. A warp plane C1, C2, C3 is a cross-sectional view of the fibrous preform along a plane normal to the stacking axis Z. In the fibrous reinforcement 4, each warp plane C1, C2, C3 is separated from the immediately adjacent warp plane by a line of weft strands.

Figure 3A:
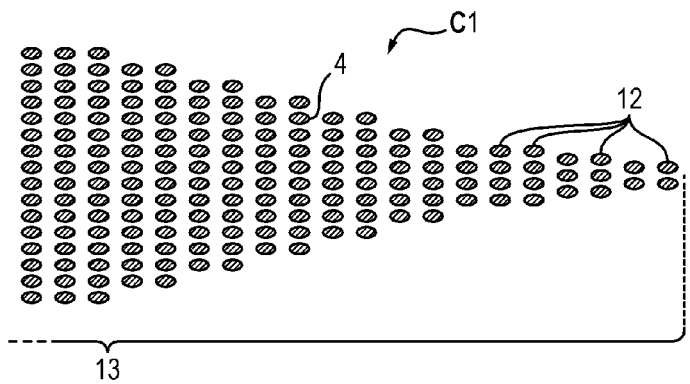
FIGS. 3a to 3c representing schematically and partially the three warp planes represented in FIG. 2.
Figure 3B:
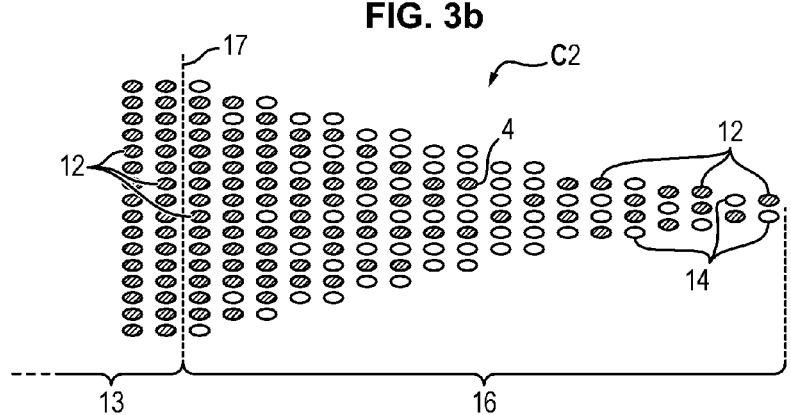
Figure 3C:
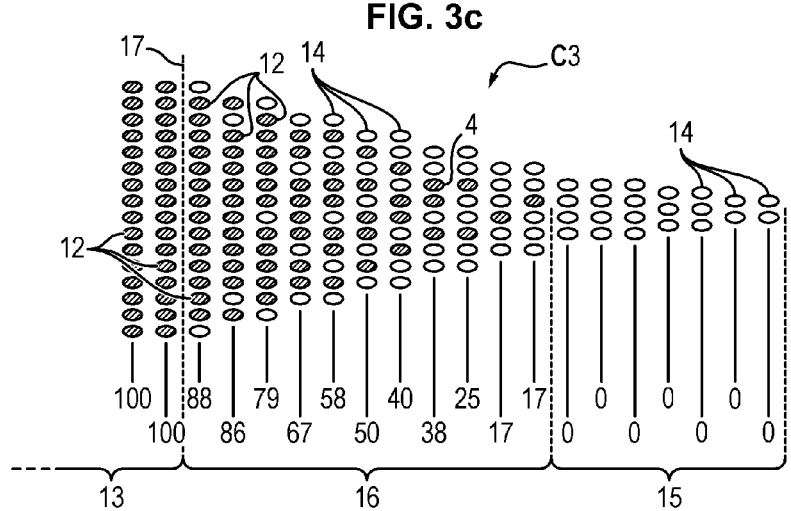
Figure 4:
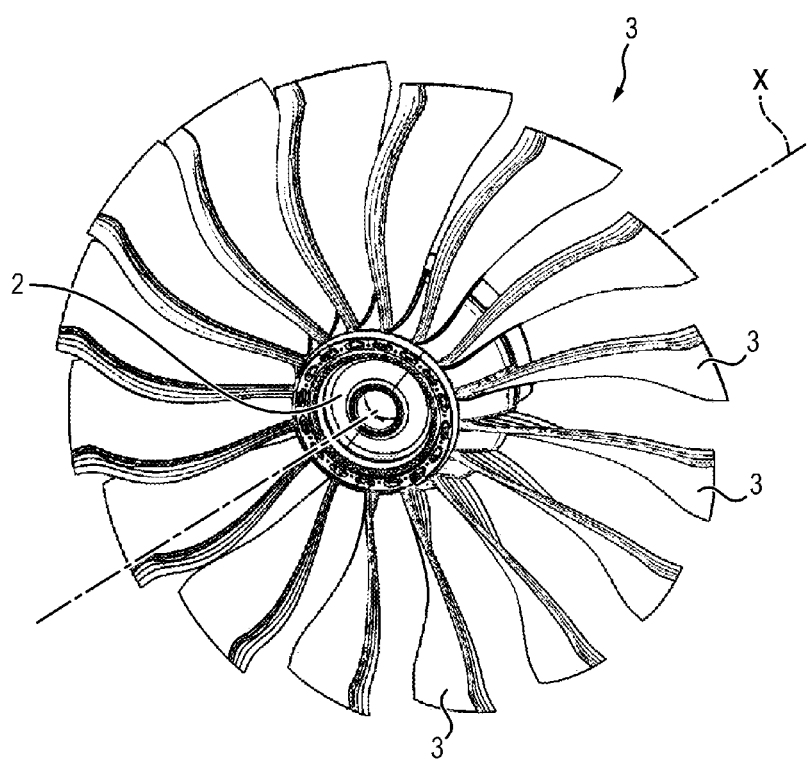
FIG. 4 is a perspective view of an example embodiment of a fan comprising blades in accordance with the invention.

Furthermore, FIGS. 3a to 3b are top views of the warp planes C1, C2, C3 of FIG. 1, in which only the warp strands (i.e., the strands of the fibrous reinforcement 4 extending along the direction of stacking of the sections) have been represented, the weft strands having been omitted in order to simplify the reading of the figure. These figures schematically illustrate an example of hybridization of the strands by inserting the second strands 14 in the warp direction at the vertical interface 17 (i.e., the interface that is substantially parallel to the trailing edge 9) and the horizontal interface 18 (i.e., the interface that is substantially parallel to the root 5 of the blade and is located radially inwardly relative to the intermediate portion 16) between the first portion 13 and the intermediate portion 16.

As can be seen in FIG. 3a, the first warp plane C1, which is part of the first portion 13 of the fibrous reinforcement 4, comprises only first strands 12.

The second warp plane C2 (FIG. 3b) is part of the intermediate portion 16 of the fibrous reinforcement 5, between the horizontal interface 18 and the first portion 13. This second warp plane C2 shows the progressive increase in the density of second strands 14 in the intermediate portion 16, both between the vertical interface 17 and the trailing edge 9 and between the horizontal interface 16 and the lower boundary of the second portion 15 (along the stacking direction Z). The increase in density of second strands 14 from the horizontal interface can be achieved by successively taking the first strands 12 out of the preform weave, at the different warp planes constituting the intermediate portion 16, and cutting them at the preform surface before injection, and simultaneously introducing the second strands 14 between these warp planes (see FIG. 1). In this way, the first portion 13, the second portion 15 and the intermediate portion 16 are formed in one piece during weaving.

The third warp plane C3 intersects the intermediate portion 16 and the second portion 15, and thus this plane C3 extends beyond the part of the intermediate portion 16 that is radially inward with respect to the second portion 15. At this warp plane, C3, the first two columns of warp strands, which are part of the first portion 13 of the fibrous reinforcement 4, comprise only first strands 12. These first two columns of warp strands are located near the vertical interface 17. The third and fourth columns of warp strands are part of the intermediate portion 16 of the fibrous reinforcement 4, proximate to its vertical interface 17. These columns of warp strands comprise two second strands 14 (which represent 88% first strands 12 and 12% second strands 14). Subsequent columns of warp strands each comprise a greater percentage of second strands 14 relative to the percentage of first strands 12, up to the fourteenth and subsequent columns of warp strands which comprise only second strands 14 and thus form part of the second portion 15 of the reinforcement 4.

In general, in order to ensure the transition of mechanical properties between the first portion 13 and the second portion 15 of the reinforcement 4 at the vertical interface 17, the percentage (based on the total number of warp strands in the column) of second strands 14 introduced between two immediately adjacent columns of warp strands of the intermediate portion 16 is at most equal to 30%. Preferably, this percentage is comprised between 5% and 15%.

In the part of the intermediate portion that extends from the horizontal interface 18, at most 30% of the warp strands are modified between two immediately adjacent warp planes (i.e., separated by only one line of weft strands). Thus, between two successive (and immediately adjacent) warp planes in the fibrous reinforcement 4, at most 30% of the first strands 12 are taken out of the fibrous preform forming the fibrous reinforcement 4 and cut at the surface, and as many second strands 14 are introduced into the fibrous preform from the surface in order to replace the first strands 12 taken out. Preferably, in this part of the intermediate portion 16, between 5% and 15% of the warp strands are modified between two immediately adjacent planes.

In an embodiment, the first strands 12 have a high Young modulus E, i.e., greater than 250 GPa, preferably greater than 270 GPa. Moreover, their elongation at break A is comprised between 1.5% and 2.5%.

For example, the first strands 12 may comprise carbon fibers, typically HS* T300 (E=284 GPa, A=1.5%), HS TR30S (E=356 GPa, A=1.9%) or HS T700 (E=395 GPa, A=2.1%) carbon fibers or high modulus aramid fibers of the Dupont Kevlar 49 type (E=302 GPa, A=2.4%).

The second strands 14 may then have an elongation at break comprised between 3% and 6%, preferably between 4% and 5%. For example, the second strands 14 may comprise glass fibers, typically E-GLASS type glass fibers (E=165 GPa, A=4.4%) or S-2 GLASS type glass fibers (E=267 GPa, A=5.2%), or basalt fibers (E=227 GPa, A=3%) or polyester fibers (E=268 GPa, A=3.5%).

In general, the configurations described are valid for engines whose fan can have an external diameter of the order of 1.8 meters to 3 meters. The number of fan blades can be equal to 16 or 18. Whatever the diameter of the fan, the number of fan blades will be reduced as much as possible. Among various criteria, a choice of parameters (in particular the distance h1) will depend more particularly on the behavior of the fan blade and the combination of "ingestion frequency/dimensioning". Indeed, for the same engine target, it is possible to choose different strategies of frequency behaviors or frequency responses in different cases of ingestion, for example to push back the blade and blading responses by avoiding vibratory crossings with energetic harmonics of the engine. For example, it is possible to make choices in order to position these crossings at transient engine speeds.

The hybridization of the strands of the fibrous reinforcement 4 also opens up the field of design thanks to the additional contribution in mechanical strength. For example, it becomes possible to refine the profile of the blade 3 at the leading edge of the preform 4 or at the trailing edge of the preform 4 or over its entire height h in comparison with a blade 3 comprising only first strands 12 (with high Young modulus), which allows the mass of the blade 3 and the aerodynamic performance of the fan 1 to be optimized (by obtaining thinner profiles or by reducing the hub ratio, which is linked to the decrease of the centrifugal force induced by the mass of the blade 3).

The invention claimed is:

1. A fan blade comprising a composite material structure comprising a fibrous reinforcement obtained by three-dimensional weaving together of first and second strands and a matrix in which the fibrous reinforcement is embedded;
   wherein the composite material structure comprises a leading edge and a trailing edge;
   wherein the fibrous reinforcement comprises a first portion forming the leading edge and a second portion forming all or part of the trailing edge;
   wherein the first strands have a first elongation at break and the second strands have a second elongation at break, the second elongation at break being greater than the first elongation at break;
   wherein the first portion comprises all or part of the first strands and is devoid of second strands; and
   wherein the second portion comprises all or part of the second strands.

2. The fan blade of claim 1, wherein the second portion comprises warp strands and weft strands, the warp strands being devoid of first strands.

3. The fan blade of claim 1, wherein the second portion extends from a tip of the fan blade.

4. The fan blade of claim 1, further comprising an airfoil having an aerodynamic profile suitable for extending into an air stream, wherein the second portion forms the trailing edge of the fan blade over all or part of a height of the airfoil.

5. The fan blade of claim 4, wherein the second portion extends over at least 35% of the height of the airfoil.

6. The fan blade of claim 1, further comprising a root configured to be fixed to a fan disk, wherein the second portion does not comprise the root.

7. The fan blade of claim 1, further comprising a root configured to be fixed to a fan disk, wherein the second portion comprises the root.

8. The fan blade of claim 1, wherein the second portion extends over a portion of a chord length of the fan blade comprised between one centimeter and fifteen centimeters.

9. The fan blade of claim 1, wherein the fibrous reinforcement further comprises a third portion extending between the first portion and the second portion, a density of the second strands being variable in the third portion and progressively increasing within the third portion from the first portion toward the second portion.

10. The fan blade of claim 9, wherein the third portion extends over a distance comprised between 1 cm and 10 cm.

11. The fan blade of claim 9, wherein the first and second strands comprise warp strands distributed so as to form warp columns, a percentage, based on a total number of warp strands in a warp column of the third portion, of second strands inserted between two immediately adjacent columns of warp strands being at most equal to 30%.

12. The fan blade as claimed in claim 11, further comprising a plurality of warp planes intersecting the warp columns, each warp plane being separated from an immediately adjacent warp plane by a line of weft strands, with no more than 30% of the warp strands being modified between two immediately adjacent warp planes in the third portion.

13. The fan blade of claim 1, wherein a Young Modulus of the first strands is greater than a Young modulus of the second strands.

14. The fan blade of claim 1, wherein the second elongation at break is comprised between 1.5 times and 3 times the first elongation at break.

15. The fan blade of claim 1, wherein the first strands comprise at least one of the followings fibers; carbon fibers, aramid fibers;
   wherein a Young modulus of the first strands is greater than 250 GPa; and
   wherein the first elongation at break is comprised between 1.5% and 2.5%.

16. The fan blade of claim 1, wherein the second elongation at break is comprised between 3% and 6%.

17. The fan blade of claim 16, wherein the second strands comprise at least one of glass fibers and basalt fibers.

18. The fan blade of claim 1, wherein the second strands comprise warp strands.

19. A fan for a gas turbine engine comprising a plurality of fan blades as claimed in claim 1.

20. The fan blade of claim 9, wherein the first and second strands comprise warp strands distributed so as to form warp columns, a percentage, based on a total number of warp strands in a warp column of the third portion, of second strands inserted between two immediately adjacent columns of warp strands being comprised between 5% and 15%.

* * * * *